Patented Mar. 29, 1932

1,851,694

UNITED STATES PATENT OFFICE

HARRY H. CULMER, OF CHICAGO, ILLINOIS

PROCESS OF DESULPHURIZING RUBBER MATERIALS

No Drawing.    Application filed November 8, 1928.    Serial No. 318,106.

This invention is a continuation in part of my application Serial No. 633,282, filed April 19, 1923.

The present invention is intended more particularly for use in the treatment of old auto tires and similar scrap or waste rubber materials containing sulphur which it is desired to "reclaim" for some re-use, and the process provides improved means of separating and removing the sulphur which is present in the compounds or mass of such scrap materials. The object of the invention is to facilitate, cheapen and more perfectly complete the desulphurization of the rubber and rubber compounds that are held in combination with sulphur, whereby the rubber content may be recovered more nearly in its initial form and again used, the objectionable sulphur whether present in chemical or only mechanical combination in the mass, being effectively extracted and eliminated or separately recovered. The desulphurizing action is accomplished by the use of ozone, ozonized air, or ozonized steam, or combinations of the same, by blowing or otherwise bringing these gases or vapors into intimate contact with the materials treated, and the cotton fiber, etc., which may also be present in the mass, is thereafter otherwise disintegrated or removed more easily and more cheaply than by present processes.

I first grind the scrap rubber materials, whether old auto casings or other wastes containing rubber, together with other materials, such as cotton, etc. in the mass. This mass or batch is finely divided or brought to a relatively comminuted state. When a batch of this is placed in a suitable receptacle for treatment, the comminuted mass of material is preferably mixed with a liquid which will retard the passage of the treating gases through the batch. The mixture is then heated to a temperature of the melting point of sulphur but below the burning point or scorching point of the materials in the batch. Ozone or ozonized air is introduced and allowed to percolate through the batch and serves to extract and combine with the sulphur compounds contained in the rubber particles. The heating of the batch promotes the reaction. During this treatment the fumes of oxidized sulphur are given off and the ozone treatment should be continued until the sulphur odor ceases. It will be found on removing the rubber from the container, or upon the stopping of the ozone treatment, that the batch is completely desulphurized and ready for re-use, or ready for further treatment, as presently mentioned, to separate the cotton fiber or other materials in the mixed batch.

A further manner of devulcanizing finely ground rubber is to sprinkle or spray hot water and pass ozone through the mass of rubber. The ozone will immediately attack the sulphur compounds and the liberated sulphur is then drawn off with the wash water, from which it is filtered out and dried.

A further variation in treating rubber for devulcanization or desulphurization by this process is to blow ozone and steam simultaneously through the granulated mass in a kettle or autoclave, and permitting the oxidized sulphur compound and sulphur to escape in the water vapors from the mass, these vapors being drawn off and any condensed steam being taken off from the bottom with what sulphur this condensed wash water may contain. The major portion of the sulphur is recovered from the steam and air blown from the top of the autoclave into condensers provided therefor.

The ozone ($O_3$) upon contact with the sulphur compounds oxidizes them to release the sulphur as sulphur dioxide ($SO_2$) and sulphur trioxide ($SO_3$). Where steam is used in combination with the ozone, both of the gaseous materials seem to attack the sulphur compounds, forming hydrogen sulphide and sulphuric dioxide in the vapors and condensed steam subsequently collected.

When it is desired to desulphurize rubber that is in solution in a liquid or solvent, these liquids and solvents, with their sulphurized rubber content, are preferably agitated in a receptacle through which the ozone, ozonized steam or air may be percolated through the liquid maintained therein. The ozonized steam serves the double purpose of heating and reacting upon the mass treated, and the ozone ($O_3$), upon contact with the sulphur compounds, oxidizes them to release the sulphur as sulphur, sulphur dioxide ($SO_2$), sulphur trioxide ($SO_3$), and also as hydrogen sulphide ($H_2S$) when ozonized steam is present.

I prefer to blow the sulphur out by the use of the gases used in liberating the compounds and condense the sulphur in an auxiliary chamber by blowing these gases and vapors into water.

In certain cases it may be desirable to draw the ozone, ozonized air, ozonized steam or gaseous mixtures through the apparatus by the use of a vacuum, in order to more readily eliminate the sulphur compounds combined therewith during its passage through the mass of rubber scrap materials treated.

It will be obvious that in dealing with a variety of scrap or waste rubber containing materials to be subjected to my process for the purpose of desulphurization that there will be found varying characteristics and degrees either of acidity or alkalinity, as well as other chemical or mechanical properties, and these variations will necessitate or render advisable some changes in the method by which the ozone or ozonized gases are introduced thereto. These variations will have to do more particularly with the introduction of some extraneous material merely for the purpose of counteracting the existence of some undesirable character in the batch and promoting or accelerating the action of the ozone, ozonized air or ozonized steam upon the particular mixed mass being treated. The object in varying the manner in which the treating gases or vapors are introduced is to accelerate the action of the release of the sulphur from the bound state and permit its removal.

Certain rubber compounds have been found to respond more actively to the treatment of ozone by having present an alkaline solution such as dilute caustic soda or ammonia, into which ozone or ozonized steam is introduced. After having the sulphur of vulcanization taken out by successive washings with water, the mass of granular substance remaining may be dried with further treatment of ozone or ozonized air to relieve the same of any sulphur content which may have been taken up during the washing operation.

Where the rubber waste materials are contained in a mass which is alkaline in character, I find the presence of an acid solution in the treating chamber during the ozone treatment improves the rate of reaction and will prove to be of decided advantage. Certain rubber articles of commerce have decidedly alkaline characteristics and in the treatment of scrap or wastes from these materials for the purpose of removing the sulphur compounds, the presence of a dilute solution of either sulphuric or hydrochloric or other acids in the mass reduces the excess alkalinity to a neutral state and greatly accelerates the action of the ozone or ozonized gas on the batch.

In the claims where I speak of a "neutralizing agent", therefore, I mean to point out in the combination of means for treating a batch of rubber materials, the use of a suitable agent to bring the batch to a neutral condition, i. e., neither acid or alkaline. If the batch is excessively alkaline in character an acid should be added, or if the batch is too acid, the addition of a sufficient quantity of some alkaline substance should be placed with the batch to correct or overcome any undue acid character of the batch, and thus maintain the batch neutral.

By this invention scrap materials have been treated with pure ozone, ozone mixed with steam, water vapor, air and steam, some responding readily to one mixture and others to another, but in the broad sense the object is to remove the sulphur from the rubber and its compounded ingredients and blow it out of the mass treated. The particular manner of treating the mass and the various forms of apparatus used in connection with the treatment will differ according to the scrap treated. It is only essential that the ozone medium be brought into intimate contact with the sulphurized scrap at a temperature of melting sulphur and the action of these essential vapors used to remove the sulphur from the rubber and drive it out or carry it out of the mass and out of the apparatus. The temperature should be kept below the scorching point of the materials treated.

The treatment of scrap rubber materials includes a wide range of accompanying substances which may take place best under atmospheric conditions under pressure or subatmospheric conditions produced by use of a vacuum pump to impose a vacuum upon the apparatus employed in order to facilitate in each and free the sulphur from the bound and combined state and drive it out of the rubber mass.

Now, after a batch of rubber materials has been given the foregoing treatment it will be found that the batch has been desulphurized cheaply and effectively and there will be distinct advantages in the subsequent handling of such batches of rubber materials in further reclaiming operations. For example, if we were treating a batch of ground auto tires, after this desulphurizing operation we will have remaining a desulphurized "rubber shoddy" which can be further treated by means well known in the so-called "rubber reclaiming" art to separate the fabric, etc. from the rubber content, but with more efficiency and at less cost. In the ordinary rubber reclaiming operations, in order to have enough caustic, which is usually employed to free the sulphur and also act on the cotton, etc. a considerable excess of caustic in the treating solution is required compared to that needed where my process is first employed, because with my ozone process used as a step in the reclaiming the necessary action on the sulphur content has been efficiently and cheaply completed and the caustic required thereafter is only that needed to act on the cotton, etc. In the ordinary reclaiming processes, an 18% to 20% solution of caustic is required, but where the batch is first treated by my herein described process of desulphurization, a caustic solution of 7% will be found sufficient for the subsequent removal of all the fabric, etc. in the batch.

I claim as my invention:

1. Steps in a process of desulphurizing scrap rubber materials containing sulphur mixed with fiber and the like, which comprise first suitably grinding or comminuting a batch of such material, placing said batch of mixed materials into a suitable receptacle, adding a liquid to fill the voids between the particles in the batch and thereby retard a too free passage of the treating agents through the batch, introducing a suitable neutralizing agent to counteract any excess of acidity or alkalinity, as the same may be, of the materials in the batch, thereby rendering the batch substantially neutral, passing a stream of ozone containing a gaseous medium through the batch to ozonize the sulphur content thereof and in the form of a gas liberating the sulphur from the other materials in the batch, and then removing the liberated sulphur containing gas from the receptacle.

2. In a process of desulphurizing rubber materials containing sulphur in a batch with other materials by subjecting the same to the reaction of ozone containing gas, the use of a suitable neutralizing agent as herein set forth to counteract any excess of either acidity or alkalinity which may be present in the batch and reduce the same to a more neutral state with respect to acid or alkali content, in order to accelerate the ozonizing reaction upon the sulphur content of the rubber materials.

3. As steps in a process of desulphurizing rubber materials containing sulphur which comprises subjecting the comminuted batch of said materials to the simultaneous action of steam and ozone vapors to bring said vapors into intimate contact with the comminuted sulphur containing particles in the batch, maintaining the joint action of steam and ozone vapors upon said mass under pressure and heating the batch to near the melting point of the sulphur until the sulphur content has been freed by and united with said vapors, and then recovering such newly formed sulphur compounds so separated from the batch by said vapors.

4. Steps in a process of desulphurizing waste and scrap rubber articles which comprise grinding and washing these articles with a neutralizing solution to render the materials neutral to test for acidity or alkalinity, subsequently subjecting this neutral ground material to the action of a stream of ozone, ozonized air and steam, which mixed vapors are brought into intimate contact with the particles of such ground materials through the voids in the mass thereof, and heating the mass until the ozone, ozonized air and steam has united with and driven out the sulphur compounds from said mass, then drawing off said sulphur compounds into a suitable receptacle in which same may be separately recovered and dried or prepared for re-use.

5. A process of extracting the sulphur from rubber and its compounding ingredients consisting in grinding said rubber articles and their compounds, neutralizing the mass if alkaline with an acid and if acid with an alkali, and subsequently subjecting the mass to the action of steam and ozonized gaseous mixtures to free the sulphur and thereupon unite therewith, and then separating the various sulphur compounds from the rubberized mass, substantially as set forth.

6. Steps in a process for freeing sulphur from the metallic bond of rubber compounding ingredients in a finely ground batch of scrap or waste rubber, comprising the use of a stream of steam and ozone brought into contact with the materials of the batch in a suitable receptacle provided with means for passing the ozone and steam therethrough, conducting the commingled steam and ozone mixture through the voids of such materials under pressure, at substantially the temperature of melting point of sulphur, whereby the sulphur compounds of said rubberized mass are freed from the mass and combined with steam and ozone and carried from said pressure receptacle into a suitable device adapted to save and recover said liberated sulphur compounds for re-use.

7. A process of desulphurizing waste and scrap rubber consisting of grinding said rubber scrap and subjecting the finely divided ground materials as an aggregate of particles in divided state to the action of heat of approximately the melting point of sulphur and simultaneously spraying said mass with water and percolating therethrough a neutralizing liquid such as caustic soda or ammonia water, and simultaneously subjecting the mass to a stream of air, ozone and steam, as a mixed vaporous and gaseous medium, whereby sulphur and its compounds contained in said ground scrap are freed therefrom and carried out of the mass and apparatus as a vapor and subsequently recovered.

In testimony whereof I affix my signature

HARRY H. CULMER.